(12) United States Patent
Neel et al.

(10) Patent No.: US 6,707,810 B1
(45) Date of Patent: Mar. 16, 2004

(54) SYSTEM AND METHOD FOR ESTABLISHING A DIRECT CALL PATH FOR ROUTING A SIGNAL TO A DATA NETWORK USING A DIGITAL LOOP CARRIER

(75) Inventors: Thomas H. Neel, Petaluma, CA (US); Stephen Mak, Denver, CO (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/326,302

(22) Filed: Jun. 4, 1999

(51) Int. Cl.⁷ ............................................. H04L 12/56
(52) U.S. Cl. ....................................... 370/352; 370/401
(58) Field of Search ................................ 370/351, 352, 370/353, 354, 357, 360, 401; 379/338, 352

(56) References Cited

U.S. PATENT DOCUMENTS

| | | | |
|---|---|---|---|
| 5,751,706 A | | 5/1998 | Land et al. .................. 370/352 |
| 6,104,704 A | * | 8/2000 | Buhler et al. ................ 370/352 |
| 6,289,097 B1 | * | 9/2001 | Gregory et al. ............. 379/338 |
| 6,356,547 B1 | * | 3/2002 | Valentine et al. ........... 370/360 |
| 6,426,955 B1 | * | 7/2002 | Dalton et al. ............... 370/401 |
| 6,493,337 B1 | * | 12/2002 | Stevenson, III ............. 370/352 |

* cited by examiner

Primary Examiner—Kenneth Vanderpuye
(74) Attorney, Agent, or Firm—Craig A. Hoersten; Richard A. Mysliwiec; V. Lawrence Sewell

(57) ABSTRACT

Connection methods and systems and databases manage resources including digital loop carriers, data network service providers in communication with a data network, and local telecommunications networks. The data network or networks used may include the Internet, frame-relay networks, and asynchronous transfer mode networks. Connections are made compatible between the various devices. The connection methods and systems allow for direct connections between digital loop carriers and data network service providers for direct routing of calls from a calling device to the data network. A call path may be established over the data network, followed by two-way communication. Various calling devices and systems may be used including conventional telephones, IP capable computers with modems, PBX networks, FAX devices.

16 Claims, 8 Drawing Sheets

SYSTEM AND METHOD FOR ESTABLISHING A DIRECT CALL PATH FOR ROUTING A SIGNAL TO A DATA NETWORK USING A DIGITAL LOOP CARRIER

TECHNICAL FIELD

The present invention relates generally to telecommunications systems and data networks, and more particularly, to systems and methods for establishing direct routing of a signal between communications devices and data networks using a digital loop carrier ("DLC")

BACKGROUND

Telecommunications networks provide for both local calling within defined regions, and long-distance calling throughout the United States and other countries. These networks may be owned and operated by public and private companies, and governments. Some of these telecommunications networks are for the private use of the owning or operating entity. Others are operated by common carriers or by telecommunications service providers for use by the public or for use by a limited group of subscribers.

Various communications devices may be used to communicate over telephone lines of existing telecommunications networks. Some devices are based on analog technology, such as conventional telephones, since they are designed to support the analog waveforms of human speech. Other devices, such as facsimile ("FAX") machines and personal computers, are based on digital technology because data processed by these devices is encoded and manipulated in binary strings of data. Personal computers may communicate over telephone lines using modems or other similar devices known to those skilled in the art.

Communications devices, such as telephones or modems, are generally connected to a service switching port ("SSP") of a local telecommunications network through a pair of wires, generally referred to as a "subscriber loop." A voltage is applied across the loop by the SSP to power the communications device, and to provide a mechanism for monitoring activity of the communications device. For example, when a calling party lifts the handset of a telephone to initiate a call, a switch in the telephone closes, enabling current to flow between the SSP and the telephone through the loop. The SSP detects current flow in the loop, and recognizes this as an "off-hook" condition. The SSP then transmits a dial tone to the communications device, thus allowing the calling party to dial the number of a called party, the intended recipient for the call.

As explained above, existing telecommunications networks allow for long-distance calling between local networks. Long-distance calling refers generally to the routing of calls over greater distances than those served by a local telecommunications network. For example, a calling party served by an SSP of a first telecommunications network may place a long-distance call to a called party served by an SSP of another telecommunications network over long-distance carriers such as fiber-optic networks. This is typically done by dialing a "1" before dialing the digits of numbers used by the called party.

Amplifiers have typically been used with circuitry for long-distance communication to compensate for signal attenuation as a call signal traverses long-distance circuitry. Because amplifiers are generally unidirectional, however, signals transmitted long-distance between telecommunications networks are generally separated into two distinct paths, such that signal transmission through each path is powered by a respective amplifier. One path is used for transmitting of call signals, and the other path is used for receiving call signals. Such signal splitting results in the use of a four-wire circuit, which is commonly referred to as a "trunk."

Various types of large capacity telecommunications networks have been specifically developed for the transport of data. These data networks typically use frame-relay ("FR"), asynchronous transfer mode ("ATM"), Internet protocol ("IP") or other packet-based technologies for data transmission. To send a data signal through a packet-based data network, the signal is first broken into individual blocks or "packets" of limited size. These individual blocks of data are then transmitted through the network and reconstructed upon receipt to form the original signal. The capacity of a data network is generally such that signals may be communicated through the network with minimal cost. Thus, if appropriate systems and methods of transmission are used, data networks may provide relatively cheaper alternatives to conventional telephone networks for local, and particularly long-distance, telecommunications.

Data networks are generally not designed to interface with existing telecommunications networks. This is because data networks typically communicate signals in the form of discrete packets or clocks of digital data, as explained above. On the other hand, telecommunications networks transmit telecommunications signals as continuous analog waveforms. Thus, to transmit an analog voice signal through a data network, for instance, the analog signal is desirably converted to digital form and then divided into blocks of appropriate size. These blocks of digital speech data are then communicated through the data network, individually. After the data blocks pass through the network, the blocks are reassembled, preferably in the order in which they were transmitted, to preserve any messages contained in the original analog voice signal. The reassembled digital voice signal is then converted back to an analog voice signal for communication to the called party.

A need has arisen for an efficient merger of a local telecommunications network, such as a publicly-switched telephone network ("PSTN"), with a data network. Most conventional techniques rely solely on the PSTNs and conventional long-distance publicly-switched telephone lines to establish the long-distance communications path. One example of a conventional long-distance communications system involves computers having video and audio capabilities. Each computer is coupled to a modem operating at, for example, V.34 modem speeds of approximately 33 Kbps. One of the computers calls from an originating telephone line served by a SSP of a first local telecommunications network, to another computer connected to a terminating phone line, served by the SSP of a second local telecommunications network. The connection between local telecommunications networks is made over a dedicated PSTN network trunk. Another example of a conventional long-distance telecommunications system includes "FAX" machines similarly served by respective telecommunications networks and communicating with one another through only PSTNs. These connections require costly equipment, including computers and FAX machines, and therefore are not universally used. A need therefore remains to provide efficient merger of a local telecommunications network with a data network.

Some techniques have recently been developed to support telecommunications over data networks such as the Internet. For example, a first private branch exchange ("PBX") and a second PBX may be placed in communication with the data network. These PBXs may then be connected via an analog trunk to various communications devices. The equipment responds to dialing, presents a ring voltage when a call is received, and passes caller identification data to a called party for an incoming call. In addition, the equipment presents each PBX with call progress tones such as ring back and busy tones when outbound calls are made. However, limitations exist with this technique since this technique is private, that is, generally within a single organization and not available to the public.

One patent relates to establishing a call path between one PSTN and another PSTN over a data network. Specifically, Land et al. describes a "System and Method for Establishing a Call Telecommunications Path," in U.S. Pat. No. 5,751,706. The system and method described by Land et al. allow for calls to be placed over packet-based telecommunications networks such as the Internet. As suggested by Land et al., however, calls are to be routed from a communications device such as telephone to a packet-based network through the switching equipment of a telecommunications network such as a PSTN. Land et al. does not disclose the establishment of direct call paths for routing calls from a communications device to the data network. Thus, while equipment exists which allows the transmission of telecommunications signals over a data network, the need for effective and efficient transport, i.e., direct routing of these signals to and from data networks, still exists.

SUMMARY

Methods and systems according to exemplary embodiments of the present invention allow a user of a conventional telephone to dial a public switched telephone number through a data network. Connections may be established and calls placed on local, national and international levels. The principles of the present invention are applicable to various data networks, including both public and private data networks. Various types of data networks may be used, including the public Internet, private intranets, public and private FR networks, public and private ATM networks, SMDS networks, and various other digital carrier systems.

According to exemplary embodiments of the present invention, a local or long-distance call path may be established through the data network between various systems and communications devices, followed by two-way communication. Systems and devices that may be used include conventional telephone systems for two-way conversation, IP capable computers with modems, PBX networks, FAX devices, and various combinations thereof. For example, communication may be established between: conventional telephone systems or devices and an IP capable digital computer connected to a modem, a local telephone network and a PBX network, an IP capable computer and a PBX network, originating and terminating FAX systems or devices, originating and terminating IP capable digital computers, etc.

Methods and systems according to exemplary embodiments of the present invention involve connection methods and databases to manage resources at local telecommunications networks, digital loop carriers, and data network service providers to make compatible connections therebetween, and manage these connections. These connection methods and systems allow for direct connections between data network service providers and digital loop carriers, that is, "line side direct" connections, both for incoming and outgoing calls to a called party or from a calling party, respectively, over a data network.

In one exemplary embodiment of the present invention, a digital loop carrier is coupled to a communications device, and coupled directly to a data network service provider in communication with a data network. In this way, a direct call path is provided between the digital loop carrier and the data network service provider for routing call signals between the communications device and the data network. The direct call path between the digital loop carrier and the data network service provider may bypass a default call path through a service switching port of a local telecommunications network.

In another exemplary embodiment of the present invention, a system is provided for establishing a communications path between a communications device and a data network. The system includes a data network service provider in communication with the data network, and a digital loop carrier coupled to the communications device. The digital loop carrier is coupled directly to the data network service provider to provide a direct call path between the digital loop carrier and the data network service provider for routing call signals between the communications device and the data network. A megahub controller may coupled to the digital loop carrier to control the routing of the call signals over the direct call path. The direct call path may be established for routing calls to the communications device and from the communications device.

In another exemplary embodiment of the present invention, a data network service provider has a plurality of paths for routing a call signal having one of a number of possible formats between a digital loop carrier and a data network. The possible formats may include voice coding, modem coding, facsimile coding, and other formats for routing telecommunications signals known to those skilled in the art. To this end, the data network service provider has circuitry configured to identify the format of the call signal and select one of the paths to carry the call signal based on the identified format.

In another exemplary embodiment of the present invention, a network topology identifying resources in a communications system may be maintained, for example, in a megahub controller used in a communications system. The communications system further includes one or more other megahub controllers, a plurality of data network service providers in communication with a data network, and a plurality of digital loop carriers coupled directly to the data network service providers. Databases, possibly in the form of routing tables, may be maintained on a recordable medium within one or more of the megahub controllers in the communications system identifying the megahub controllers, the data network service providers, the digital loop carriers, and various trunk groups coupled between the various components in the communications system. The digital loop carriers are preferably indexed by telephone numbers supported by the respective digital loop carriers.

One exemplary method of the present invention involves establishing a communications path between a digital loop carrier, which is in communication with a communications device, and a data network service provider in communication with a data network. In this way, a call signal may be carried between the communications device and the data network, for calls sent to and from the data network. The digital loop carrier is coupled to a service switching port of a telecommunications network by a communications line. The service switching port is coupled to the data network service provider. The service switching port has a call processing feature which, when activated by the service switching port, processes calls transmitted over the communications line. Exemplary call processing features include call forwarding, call waiting, and three-way calling. The method includes determining whether the service switching port has activated the call processing feature for the communications line, and establishing, if the call processing feature is inactive, the communications path using the direct trunk group. If the call processing feature is active, the communications path is established through the service switching port using the communications line.

BRIEF DESCRIPTION

The invention will be described with respect to particular embodiments thereof, and reference will be made to the drawings in which like numbers designate like parts and in which.

Figure 7:
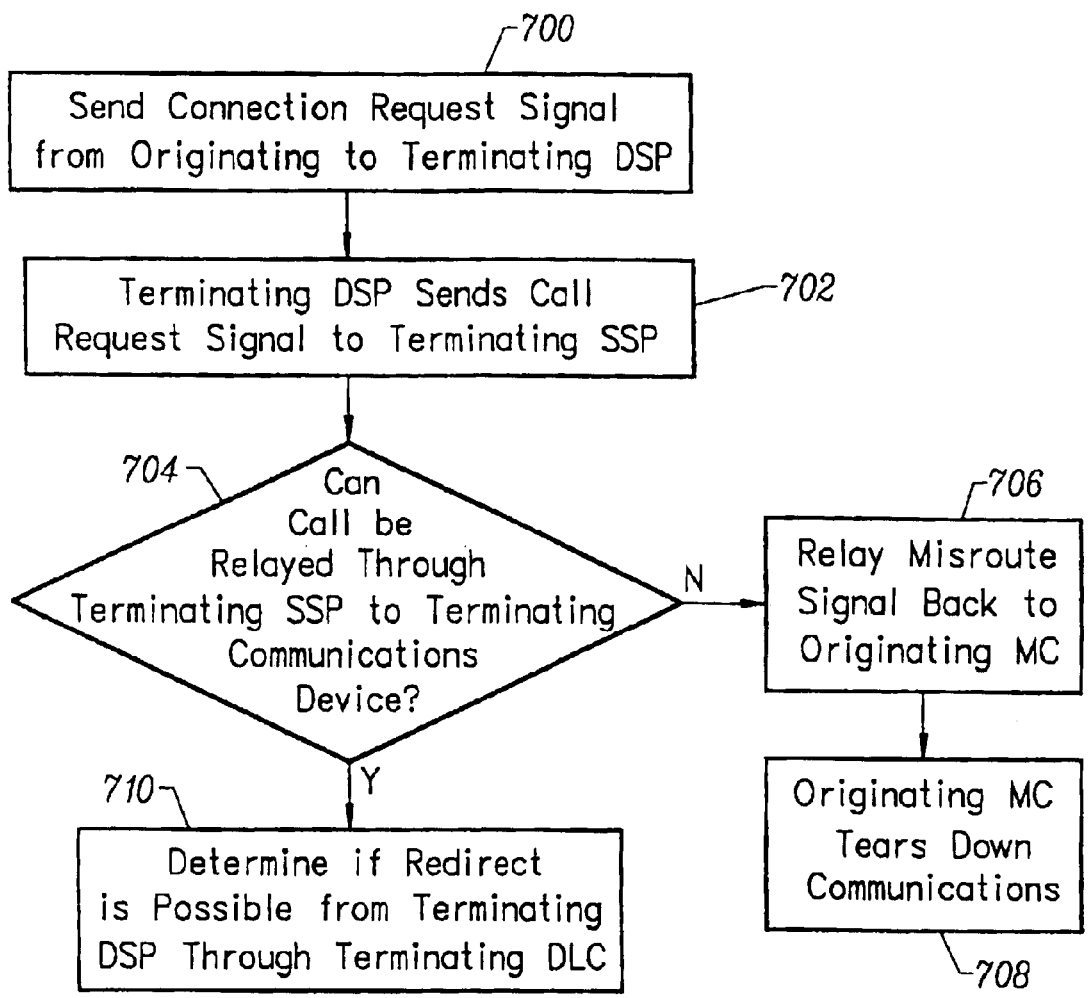
Figure 8:
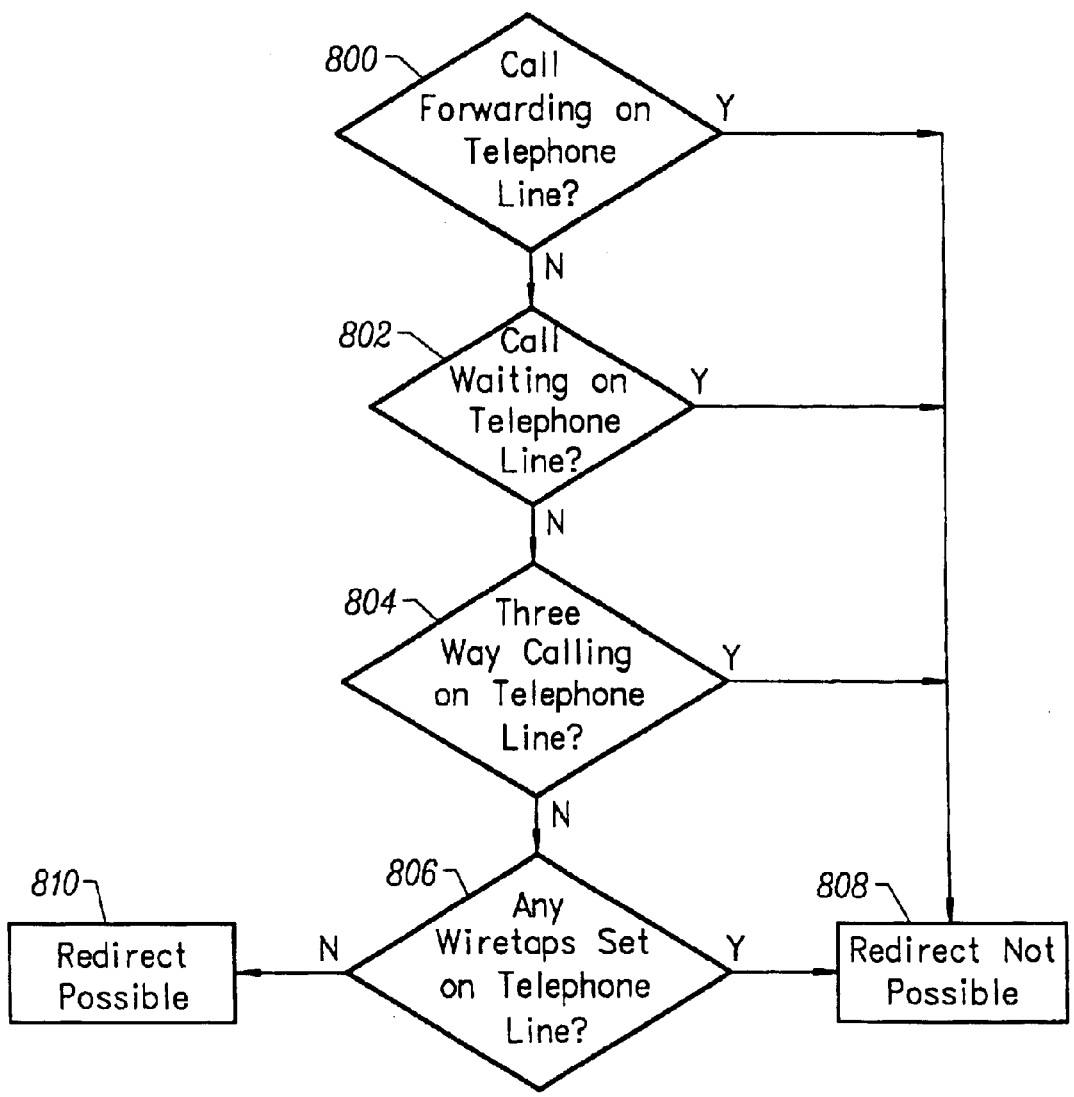

FIG. 7 is a flow diagram showing a method for determining whether resources are available in a communications system for carrying a call signal from a data network to a called party, according to an exemplary embodiment of the present invention; and FIG. 8 is a flow diagram showing a method for establishing a direct communications path between a communications device and a data network through a digital loop carrier, according to an exemplary embodiment of the present invention.

DETAILED DESCRIPTION

Communications Systems

Figure 1:
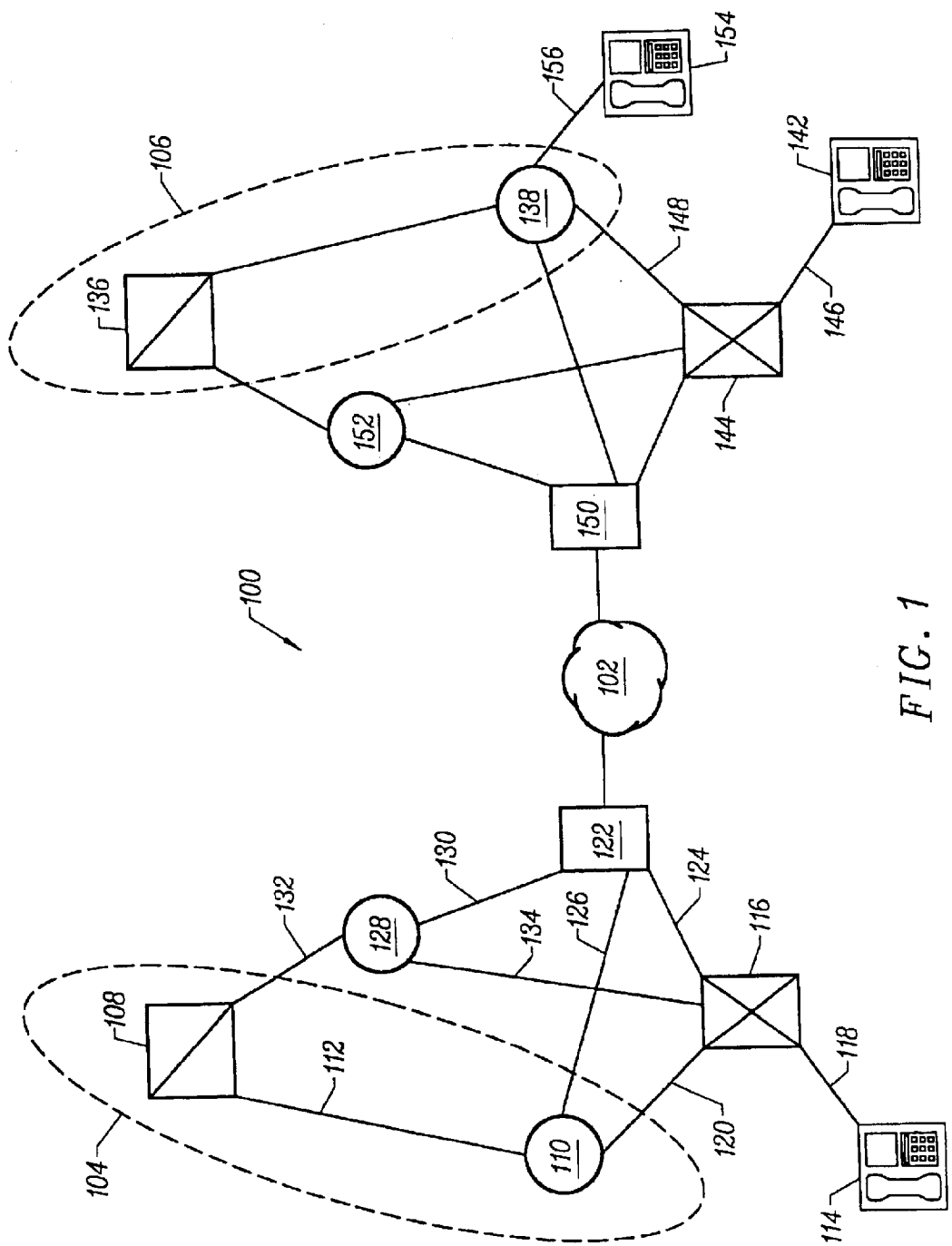
FIG. 1 is a schematic block diagram of a system for sending telephony signals between local telecommunications networks and devices over a data network, according to an exemplary embodiment of the present invention.

FIG. 1 is a schematic block diagram of a system 100 for sending telephony signals between local telecommunications networks and communications devices over a data network 102, according to an exemplary embodiment of the present invention. The local telecommunications networks of FIG. 1 include an originating network 104 and a terminating network 106. Data network 102 may be the Internet, a FR network, an ATM network, or other packet-based telecommunications network known to those skilled in the art.

In FIG. 1, originating network 104 is represented as a local end office of a PSTN, and includes an originating signal transfer point ("STP") 108 and an originating service switching port ("SSP") 110. Originating SSP 110 may, for example, include switching equipment commonly used in the end office of a public or private telecommunications network. Originating STP 108 is in communication with originating SSP 110 via a signaling system number 7 ("SS7") 'A' link 112.

In FIG. 1, system 100 further includes an originating communications device 114, represented in FIG. 1 as a conventional telephone device or system. Communications device 114 may also be any other suitable communications system or device such as a FAX machine or a modem connected to a digital computer. First communications device 114 may be a conventional telephone system, an IP capable computer, a PBX network, or any other suitable communications system or device such as a FAX machine.

In FIG. 1, communications to and from originating communications device 114 is supported by an originating digital loop carrier ("DLC") 116, to which originating communications device 114 is coupled via an originating telephone line 118. Originating DLC 116, in turn, communicates with originating SSP 110 of the originating telecommunications network over line 120. Originating DLC 116 is preferably one of the digital loop carrier products made by Alcatel USA, such as the Litespan®-2000 or Litespan®-Broadband DLCS and described in greater detail below. Line 120 is identified by originating SSP 110 according to a particular telephone number, and is supported by originating SSP 110 for the routing of calls to and from originating DLC 116 and originating communications device 114.

In FIG. 1, an originating data network service provider ("DSP") 122 is in communication with data network 102. Originating DSP 122 is also coupled directly to originating DLC 116 via a direct trunk group 124, and is coupled to originating SSP 110 of originating network 104 via an SS7 trunk 126. A plurality of additional originating DSPs (not shown) may also be similarly coupled to originating DLC 116 and originating SSP 110, by separate trunk groups, respectively.

A digital loop carrier, such as originating DLC 116 of FIG. 1, used according to exemplary embodiments of the present invention, is coupled directly to a data network service provider 122. The direct coupling between the digital loop carrier and data network service provider may be realized using a digital T1 carrier, primary rate ISDN circuits or other interfaces known to those skilled in the art. In addition, one or more multiplexers may be coupled between the digital loop carrier and data network service provider to multiplex signals communicated therebetween to various transmission rates. This holds true for both the originating DLC 116 and terminating DLC 144 and the respective DSPs 122, 150 to which DLCs 116, 144 are coupled.

By coupling the digital loop carrier directly to the data network service provider, calls may be routed directly from a communications device to the data network service provider through the digital loop carrier. Similarly, calls may be routed directly from the data network service provider to the communications device through the digital loop carrier. Local switching equipment, for example, a Class 5 switch of a local network or PSTN, is thus bypassed by this direct routing of call signals.

As should be understood by those skilled in the art, other suitable carriers or switches may be used in place of the digital loop carrier, whether on the "originating" or "terminating" sides of a communications system, such as an edge switch or a transport carrier, in accordance with the present invention. Thus, as used herein, "digital loop carrier," refers to any such suitable carrier or switch, which may be coupled directly to a data network service provider to provide direct routing of call signals between the data network service provider and the communications device.

The direct routing of calls to a DSP through the digital loop carrier, as provided by exemplary embodiments of the present invention, has a number of significant advantages over the conventional routing of calls through local end office switching equipment. One advantage of coupling digital loop carriers directly to DSPs is that the cost per DS1 or a primary rate interface ("PRI") per port or per circuit is lower, as opposed to connecting local end office switching equipment to DSPs. In addition, the number of switching elements required to transport call signals is reduced, as well as the cost of links which would be required to couple these network elements to one another. Also, coupling digital loop carriers directly to DSPs provides for faster changing of activate direct calling routes. Lastly, the cost otherwise imposed on telephone companies and data network service provider companies for using class 5 equipment for line side and trunk side long duration calls and data calls is reduced. Other advantages will be recognized and appreciated by the skilled artisan.

In FIG. 1, originating DSP 122 is in communication with an originating megahub controller 128. Originating megahub controller 128 is connected to originating DSP 122 by a network interface 130, as shown in FIG. 1. Originating megahub controller 128 communicates with and controls originating DSP 122 through this network interface 130. Network interface 130 enhances call compatibility between originating network 104 and originating megahub controller 128, and allows call signals to be communicated from originating network 104 to originating DSP 122, as described in greater detail below. Network interface 130 also provides for the exchange of message signals and call connection information, including two-way call connection information, between originating megahub controller 128 and originating DSP 122.

In FIG. 1, originating megahub controller 128 is in communication with originating STP 108 of originating network 104 via an SS7 'A' link 132, and in communication with originating DLC 116 via a dedicated control link 134. Dedicated control link 134 supports the exchanging of message signals between originating megahub controller 128 and originating DLC 116 for various purposes such as: (i) updating databases maintained in originating megahub controller 128, (ii) communicating call connection information, including two-way call connection information, between original megahub controller 128 and originating DLC 116, (iii) sending commands from originating megahub controller 128 to originating DLC to connect line card ports to direct trunk group 124 or other trunk groups connected to DSPN 122, and (iv) disconnecting DLC 116 connections as may be required for calls to DSP 122.

In FIG. 1, terminating network 106 includes a terminating STP 136 and a terminating SSP 138. Terminating STP 136 is connected to terminating SSP 138 by an SS7 'A' communications link 140. A first terminating communications device 142 is in communication with a terminating DLC 144 over a first terminating telephone line 146 coupled therebetween. First communications device 142 may be a conventional telephone system, an IP capable computer, a PBX network, or any other suitable communications system or device such as a FAX machine. Terminating DLC 144 communicates with terminating SSP 138 of terminating network 106 over 148. Similar to line 120, line 148 is identified by terminating SSP 138 by a particular telephone number, and is supported by terminating SSP 138 for the routing of calls to and from terminating DLC 144 and terminating communications device 142. A second terminating communications device 154 is served directly by terminating SSP 138 over a second terminating telephone line 156.

A terminating DSP 150 is in communication with data network 102. Terminating DSP 150 communicates with originating DSP 122 over data network 102, preferably using dedicated encrypted network service provider circuits. Terminating DSP 150 is also in communication with both terminating DLC 144, and terminating SSP 138 of terminating network 106. In addition, terminating DSP 150 is in communication with a terminating megahub controller 152. Other links or lines between the various "terminating" devices in system 100 are similar in structure and use to those between corresponding "originating" devices in system 100.

Figure 2:
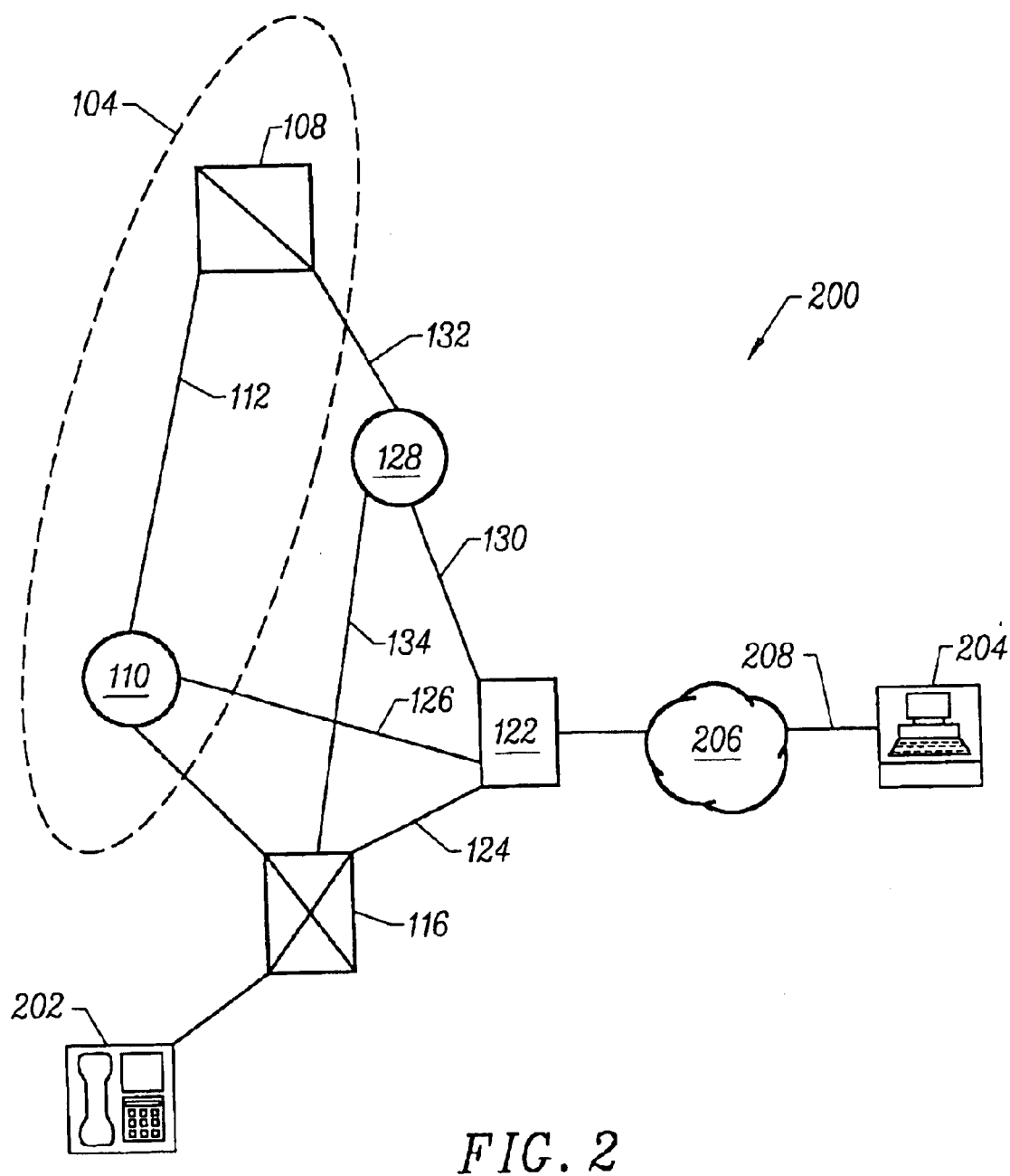
FIG. 2 is a schematic block diagram of a system for sending telephony signals between a conventional telephone system and a digital computer with a modem over a data network, according to an exemplary embodiment of the present invention.

FIG. 2 is a schematic block diagram of a system 200 sending telephony signals between a conventional telephone system 202 and an IP capable digital computer 204 through a data network, for example, Internet 206, according to an exemplary embodiment of the present invention. Digital computer 204 has an internal modem which communicates directly with Internet 206 over a T1 line 207. The remainder of the devices and connections therebetween shown in FIG. 2 are similar to devices described with reference to FIG. 1, where like reference numerals indicate like parts throughout. In FIG. 2, digital computer 204 establishes a communications path with telephone system 202 to send a call signal, using methods described in greater detail below. Originating megahub controller 128 maintains this link with digital computer 204, using call management techniques as described below.

Megahub controllers 128 and 152, as illustrated in FIG. 1, exchange information relating to the availability of resources to provide efficient routing of calls. These resources include devices such as SSPs and DLCs with which the respective megahub controllers communicate. For example, in FIG. 1, terminating megahub controller 152 periodically communicates to originating megahub controller 128 the availability of terminating SSP 138 and terminating DLC 144 to receive calls.

Figure 3:
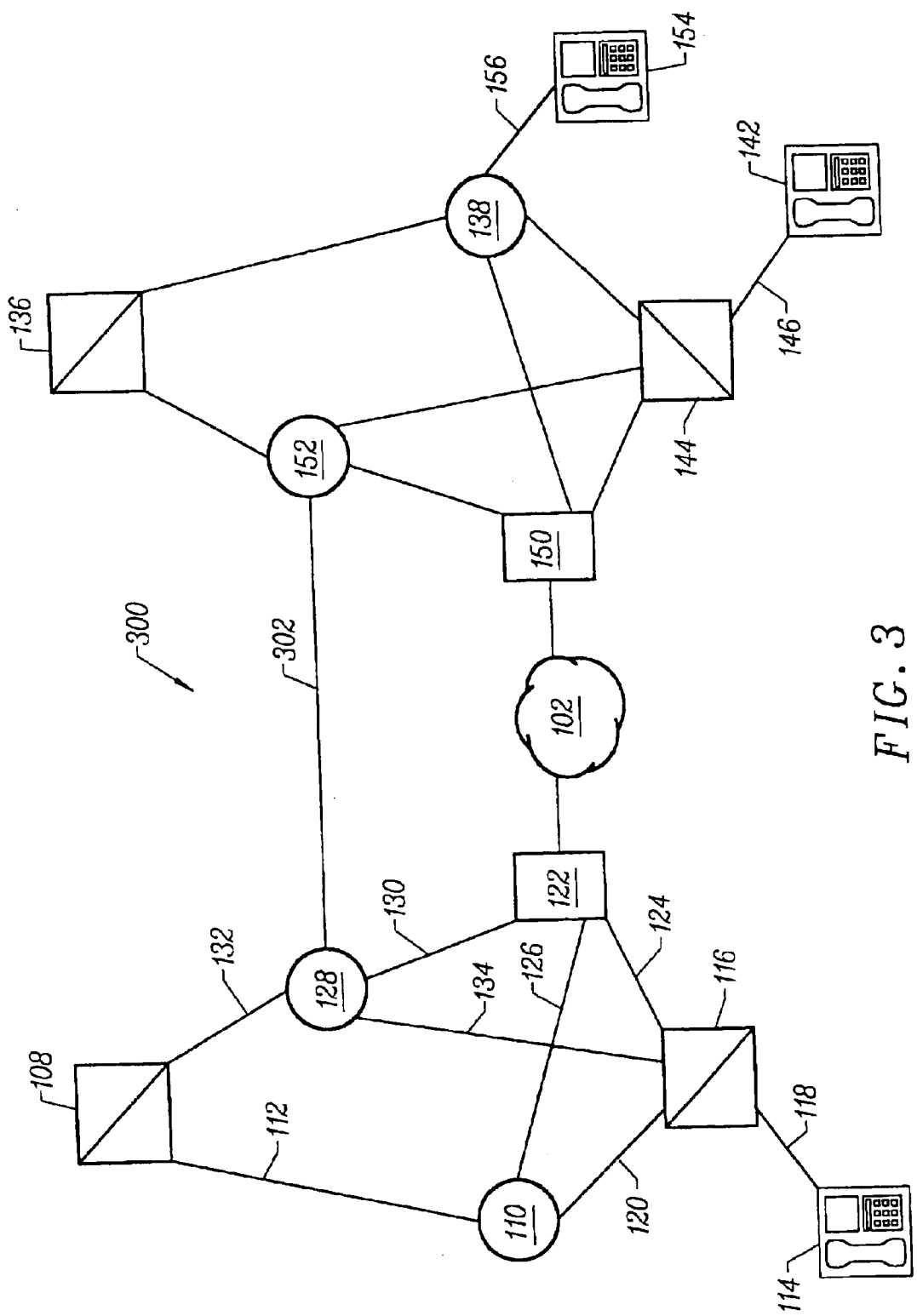
FIG. 3 is a schematic block diagram of a system for sending telephony signals between local telecommunications networks and devices over a data network using nonassociated signaling, according to an exemplary embodiment of the present invention.

The exchanging of information between megahub controllers in FIG. 1 is performed using associated signaling; that is, the information is relayed over data network 102. FIG. 3 illustrates an alternative to the associated signaling of FIG. 1, in which direct coupling is used between megahub controllers for exchanging information as to resource availability. In the "non-associated" signaling arrangement of communications system 300, originating megahub controller 128 is coupled directly to terminating megahub controller 152 over a dedicated control link 302. This direct connection between megahub controllers 128 and 152 represents a modification to system 100 of FIG. 1, in that direct link 302 between megahub controllers 128 and 152 supplements existing communications links between DSPs 122 and 150 through data network 102. This results in faster call establishment and higher signaling capacity, as more bandwidth between DSPs 122 and 150 is available to carry call signals.

In FIGS. 1–3, both the originating DSP 122 and terminating DSP 150 are in communication with data network 102. The originating 122 and terminating 150 DSPs are responsible for managing connections to data network 102, and the DSPs monitor the quality of data links in data network 102, particularly for the transportation of voice and other analog signals. DSPs 122 and 150 also serve in routing calls to data network 102 by prioritizing call signals to and from data network 102. In addition, DSPs 122 and 150 may be in communication with several data networks, in which case the DSPs are configured to select a suitable data network from the several to carry a call signal. For example, DSP 122 may be in communication with the Internet, a private intranet, ATM networks, and FR networks, and select one of these networks for transmission of a call signal. This selection may be based, for example, on the time of day, the availability of terminating DSP 150, QoS requirements, cost, and the amount of traffic in the various data networks.

DSPs constructed in accordance with the present invention, such as originating DSP 122 and terminating DSP 150, communicate with one another through the data network 102 to which the respective DSPs are coupled. To this end, each DSP includes a control circuit such as a service provider network circuit (PVC) for sending signals through the data network to other DSPs in the system, and receiving signals from the other DSPs. The control circuits preferably have encryption capabilities to ensure secure communications between the DSPs. Data signals transmitted through the DSP are desirably processed using packet segmentation and intelligent packet discard to maintain a tolerable quality of service across an otherwise sometimes unreliable data network, like the Internet. A terminating DSP receiving incoming calls from the data network is responsible for maintaining the packet sequence and delivering voice signals at the desired pace.

Because the originating 122 and terminating 150 DSPs are in communication with their respective megahub controllers, as well as with one another, if a connection fails between one of the DSPs and another device or network in the communications system, both originating 128 and terminating 152 megahub controllers may be notified by the respective DSPs. Also, as described in greater detail below, during the call establishment stage of a telephone call, originating 122 and terminating DSPs 150 exchange information identifying the calling number and the called number, as well as the availability of resources such as modems and FAX connections to carry a call to or from a digital computer with modem, or a FAX machine, respectively.

Figure 4:
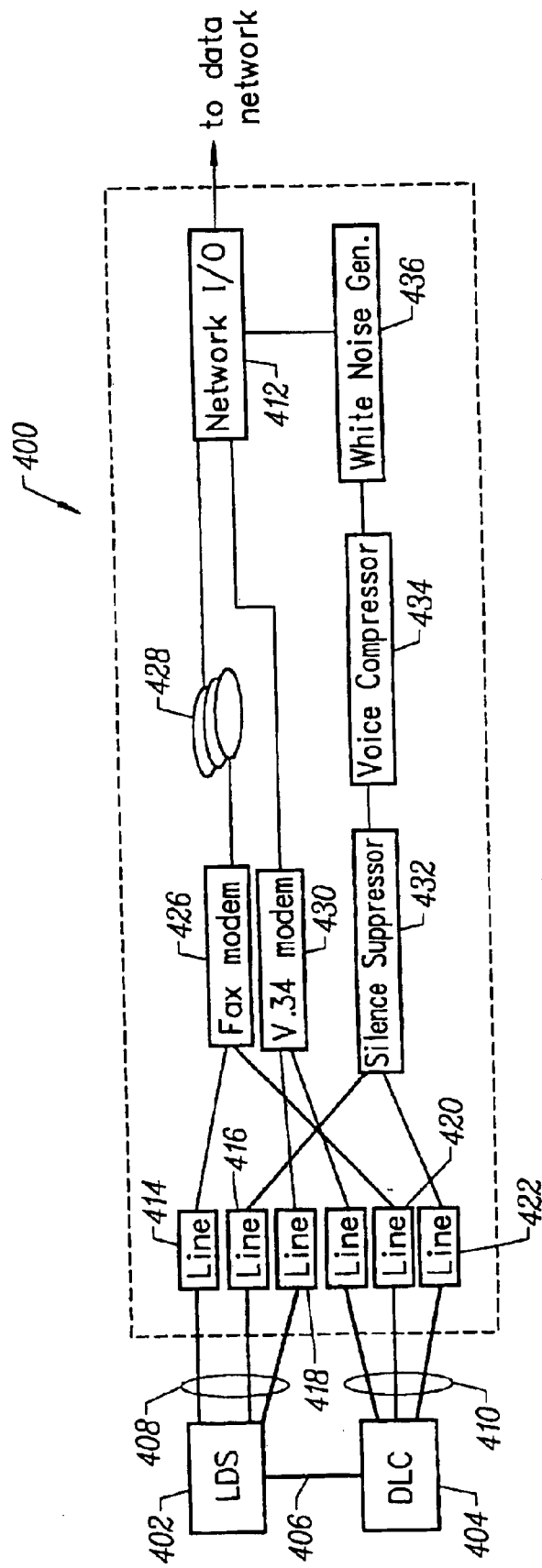
FIG. 4 is a schematic block diagram of an exemplary data network service provider for use with a system for sending telephony signals between local telecommunications networks and devices over a data network, according to an exemplary embodiment of the present invention.

FIG. 4 is a schematic block diagram of an exemplary DSP 400 constructed according to the present invention, for use as an originating or terminating DSP in communications systems such as those illustrated in FIGS. 1–3. At one end, DSP 400 is coupled to a local digital switch ("LDS") 402, and a DLC 404. For example, if DSP 400 were used as originating DSP 122 in system 200 of FIG. 2, LDS 402 would be an example of originating SSP 110, and DLC 404 would correspond to originating DLC 116. LDS 402 and DLC 404 are coupled to one another via a SS7 trunk group 406. DSP 400 is connected to LDS 402 via a SS7 trunk group 408, and DSP 400 is also connected to DLC 404 through a dedicated direct trunk group 410. At the other end, DSP 400 communicates with one or more data networks (not shown), such as the Internet, a FR network, ATM network, or other data network known to those skilled in the art, through a network I/O interface 412.

Exemplary DSPs of the present invention, such as DSP 400 of FIG. 4, are capable of recognizing and supporting the transmission of data signals having various formats, such as Group III FAX, V.34 Modem, PCM coded voice, 56 Kbps Modem, and 2B1Q coded voice. The DSP decodes incoming data signals having these formats, and encodes the decoded signals into other formats suitable for transport to or from the data network. DSP 400 of FIG. 4 has circuitry to differentiate among voice, modem and FAX calls. This circuitry includes line units and modem groups serving those line units.

In FIG. 4, within DSP 400 is a first group of line units which are connected to LDS 402 via SS7 trunk group 408, with each trunk in the group designated to carry data signal formats recognizable by the particular line unit to which that trunk is connected. Line units within this first group include a FAX line unit 414, a voice line unit 416, and a V.34 Modem line unit 418, coupled to receive call signals from and send call signals to LDS 402. Similarly, DSP 400 includes a second group of line units which are connected to DLC 404 via direct trunk group 410. Line units within this second group include a FAX line unit 420, a V.34 Modem line unit 422, and a voice line unit 424, coupled to receive data signals from and send call signals to DLC 404.

In FIG. 4, FAX signals communicated either to line unit 414 from LDS 402 or to line unit 414 from DLC 404 are then communicated to a FAX modem 426 which is capable of decoding the FAX signals and communicating the decoded signal to a CPU 428, and then to the data network through network I/O interface 412. V.34 modem signals communicated either to line unit 418 from LDS 402 or to line unit 422 from DLC 404 are communicated to a V.34 modem 430 which is configured to recognize and decode modem signals and communicate the decoded modem signals to the data network through network I/O interface 412. 56 Kbps or other modem signals may be used, in which case V.34 modem 430 within DSP 400 is replaced with a 56 Kbps modem or other suitable modem.

In FIG. 4, DSP 400 uses voice digitalization and compression schemes to enable analog voice signals to be transported to or from the data network. For example, in FIG. 4, line unit 416 may receive analog voice signals (e.g., signals with frequencies centered at about 4 KHz) from LDS 402 over one of the trunks in SS7 trunk group 408. Similarly, line unit 424 may receive analog voice signals from DLC 404 over one of the trunks in direct trunk group 410. DSP 400 further includes a silence suppression unit 432, a voice compression unit 434, and a white noise generator 436, coupled as shown in FIG. 4.

The voice processing circuitry in DSP 400 of FIG. 4 has several benefits. Silence suppression unit 432 performs silence removal on transmitted voice signals to make more efficient use of the data network. In addition, performing voice compression on the voice signal using voice compressor 434 reduces the load on the data network. Also, white noise generator 436 injects background noise into the voice signal to replace silence when, for instance, packets are lost in transmission of the voice signal.

Exemplary DSPs constructed according to the present invention may also include databases stored and maintained therein that identify megahub controllers in the communications system, which administer the routing of calls to particular telephone numbers. Preferable, these databases also identify associated routes to other DSPs in the system which are coupled to those megahub controllers. Exemplary DSPs may also manage billing. Billing records may be recorded within the DSP and maintained for individual calling parties. Preferably, any such billing is characterized by the format of the call signal (e.g., voice, FAX, modem).

In FIG. 1, originating megahub controller 128 is configured to route call signals over data network 102 through any of various data links. Originating megahub controller 128 administers calls using a session protocol, which is recognized by other components in the system. The session protocol preferably protects against eavesdropping by parties other than the calling party and called party, and generally includes three stages: (i) call establishment, (ii) data transfer, and (iii) call termination, all of which are described in greater detail below.

Whether using an associated signaling arrangement as illustrated in FIG. 1, or a non-associated signaling arrangement as illustrated in FIG. 3, the megahub controllers are responsible for establishing and administering communications paths over the data network for call signals. To establish a communications or "call" path, the megahub controllers and DSPs are configured to send setup signals, call processing signals, connect signals, and release signals to one another. The particular information communicated between megahub controllers varies, depending on the particular signal.

A typical call setup signal conveys: signal type (setup, release, call processing, connect), call format or type (e.g., FAX, modem, voice), number of the calling party, number of the called party number, an origination point code identifying the originating megahub controller, a destination point code identifying the terminating megahub controller, QoS parameters (e.g., bandwidth, traffic class, delay variation, etc.), origination channel identification, call reference, redirect number, and an address identifying the originating DSP. A typical call processing signal conveys call reference, and an address identifying the terminating DSP. A typical connect signal conveys call reference, QoS parameters, termination channel identification, and an address identifying the terminating DSP. Lastly, a typical release signal conveys call reference and cause.

Figure 5:
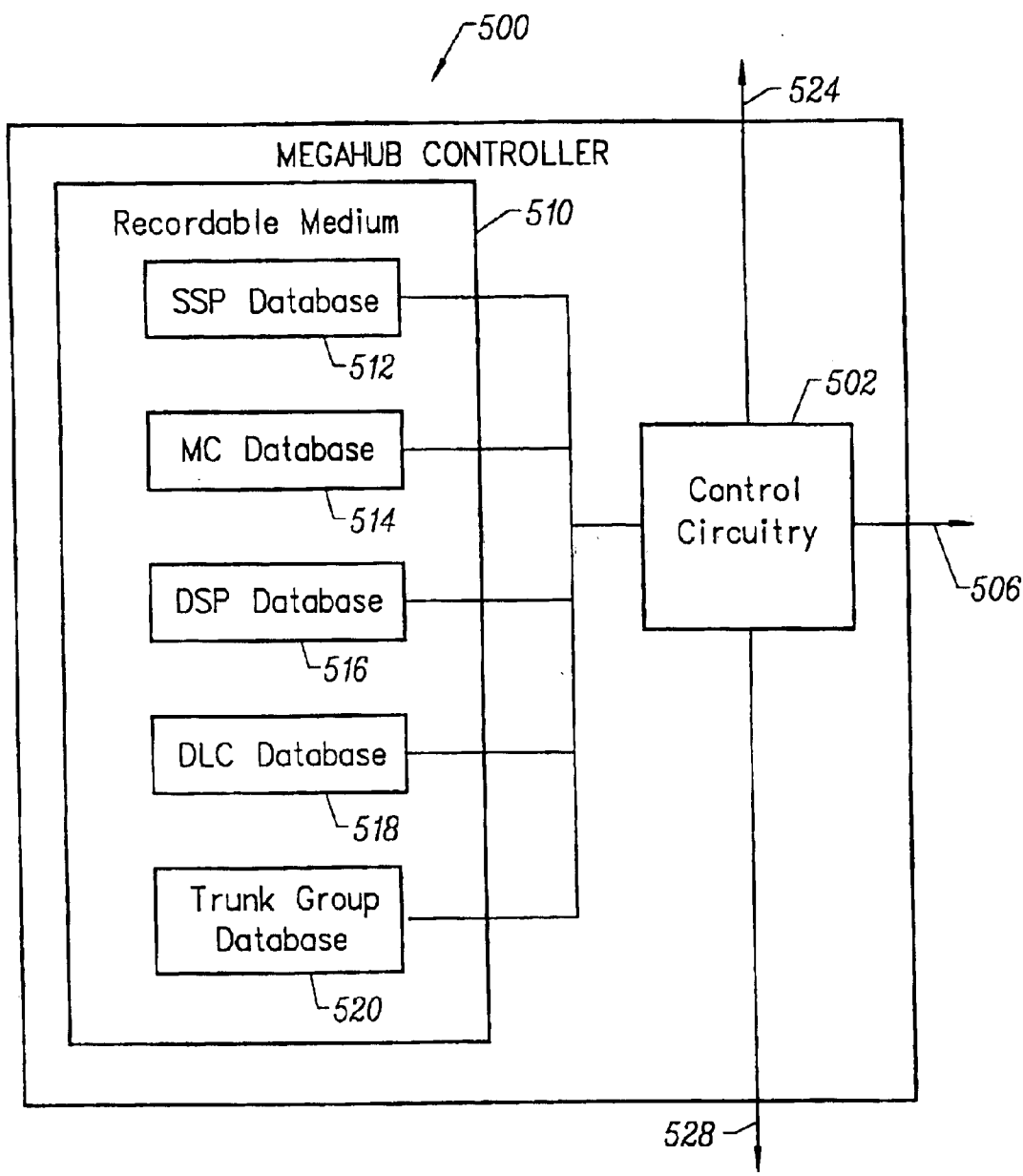
FIG. 5 is a schematic block diagram of an exemplary megahub controller for use with a system for sending telephony signals between local telecommunications networks and devices over a data network, according to an exemplary embodiment of the present invention.

FIG. 5 is a schematic block diagram of an exemplary megahub controller 500 for use with a system such as those illustrated in FIGS. 1–3 for sending telephony signals between local telecommunications networks and devices over a data network, according to an exemplary embodiment of the present invention. Megahub controller 500 includes a group of control circuits 502 configured to send signals to and receive signals from various devices in a communications system. Control circuitry 502 may be linked to devices illustrated in FIGS. 1–3 via interfaces 504, 506, and 508. For example, if megahub controller 500 is used as originating megahub controller 128 in FIG. 1, interface 504 may be connected to SS7 'A' link 132 for communications with originating STP 108. Similarly, interface 506 may be connected to network interface 130 for communications with originating DSP 122, and interface 508 may be connected to dedicated control link 134 for transmitting control signals to originating DLC 116.

Megahub controllers constructed in accordance with the present invention are used in communications systems such as system 100 of FIG. 1 to perform call management, that is, to administer the routing of calls through system 100. Control circuitry 502 in originating megahub controller 128, for example, is configured to administer the routing of outbound calls from a calling party to a called party. By the same token, control circuitry 502 in terminating megahub controller 152 is configured to administer the routing of inbound calls from the called party to the calling party. Control circuitry 502 is also configured to "redirect" calls from a DLC directly to a DSP, in FIG. 1 for example, to originating DSP 122 through originating DLC 116. Particular techniques used for establishing call paths for routing calls are described in greater detail below.

In order to perform the desired routing of calls, an exemplary megahub controller maintains a network topology of the trunking facilities in a communications system in which it is used, including identifying various resources in the system such as DSPs, DLCs, and SSPs. Originating megahub controller 128 communicates with terminating megahub controller 152 through data network 102, using an associated signaling arrangement, to administer and monitor usage of these various components of the system.

In FIG. 5, according to exemplary embodiments of the present invention, the network topology maintained by megahub controller 500 is realized using databases, preferably stored within megahub controller 500 on a recordable medium 510. These databases may be organized, for example, as routing tables with information identifying devices and components in the system with which the megahub controller communicates. Several databases are maintained by control circuitry 502 in megahub controller 500, including an SSP database 512 identifying SSPs, such as local digital switches, coupled to and in communication with megahub controller 500, indexed by telephone numbers of lines served by the respective SSPs. Megahub controller 500 further includes a MC database 514 identifying other megahub controllers in the communications system with which megahub controller 500 communicates, whether using associated or non-associated signaling or other signaling techniques known to those skilled in the art.

In FIG. 5, megahub controller also includes a DSP database 516 identifying DSPs in communication with megahub controller 500. The DSPs are preferably identified by addresses, for example, in the form of 5-digit carrier codes. The addresses which identify DSPs may take various forms, depending on the particular data network 102 used. For example, a DLCI number may be used if data network 102 is a FR network, or an E.164 address may be used if data network 102 is an ATM network. If data network 102 is the Internet, this address is most likely an IP address. The DSP addresses are preferably indexed by codes which identify telephone lines served by the respective DSPs. For example, in FIG. 1, DSP 150 may be indexed by codes corresponding to first and second terminating telephone lines 146 and 156.

In FIG. 5, megahub controller 500 also includes a DLC database 518 identifying each DLC with which megahub controller 500 communicates to provide direct routing of calls to a DSP over, for example, direct trunk group 124 in FIG. 1. The DLCs identified in database 518 are preferably indexed by telephone numbers identifying lines supported by the respective DLCs. For example, in FIG. 1, terminating DLC 144 is indexed by the telephone number corresponding to line 148. The collection of telephone numbers served by respective DLCs is generally updated within each DLCs periodically, for example, on a daily or weekly basis. Thus, it is desirable that these numbers be periodically retrieved by megahub controller 500 from the respective DLCs. Alternatively, access identifier ("AID") information may be used instead of telephone numbers in database 518 to identify telephone lines of the respective DLCs.

Lastly, in FIG. 5, megahub controller 500 includes a trunk group database 520, which identifies: (i) particular trunk groups which provide routing of calls from SSPs to DSPs for transmission over the data network for each DSP identified in DSP database 516, and (ii) trunk groups which provide direct routing of calls to DSPs from DLCs which are in communication with megahub controller 500, for instance, direct trunk group 124 of FIG. 1. The portion of trunk group database 520 dedicated to identifying connections between DLCs and DSPs preferably also inventories circuit members used by the respective DLCs for connection to the DSPs.

Communications Methods

The first stage of the session protocol administered by megahub controllers in communications systems according to exemplary embodiments of the present invention involves establishing a communications channel or "call path" for transmission of a call signal over the data network. Referring to FIG. 1, a calling party activates originating communications device 114. For example, if communications device is a telephone, the telephone is activated by lifting the receiver off of the telephone hook. Activation of originating communications device 114 is detected by originating DLC 116, and recognized as an "off-hook" condition. The off-hook condition is then communicated by originating DLC 116 as a signal to originating SSP 110 over line 120. Upon receiving the off-hook signal, originating SSP 110 relays a dial tone back through originating DLC 116 to originating communications device 114. The calling party may then select a particular DSP for communicating the call signal to data network 102, if provided with this option, or proceed directly with placement of a call by dialing the digits of a telephone number identifying a particular telephone line used by the called party, such as line 148 or line 156.

The dialed digits are communicated from originating communications device 114 to originating DLC 116, and then to originating SSP 120. The originating SSP 120 then communicates an initial address message ("IAM") signal to originating megahub controller 128 through originating STP 108. The IAM signal includes, at least: (1) information identifying the telephone number of originating telephone line 118 used by the calling party, (2) information identifying the telephone number of the called party, for instance, the number corresponding to first terminating telephone line 148, and (3) a destination point code identifying terminating megahub controller 152.

Originating megahub controller 128 has verification circuitry configured to verify the destination point code, such as local number portability ("LNP") databases which contain numbers identifying various terminating SSPs and terminating DLCs with which communications may be established over the data network, as explained above. The destination point code of terminating megahub controller 152 is cross-referenced against the numbers in the MC database 514 to confirm that terminating megahub controller 152 is in communication with originating megahub controller 128, to establish a call path. In addition, terminating SSP 138 is identified using the dialed telephone number, in this example, the number corresponding to line 148.

Figure 6:
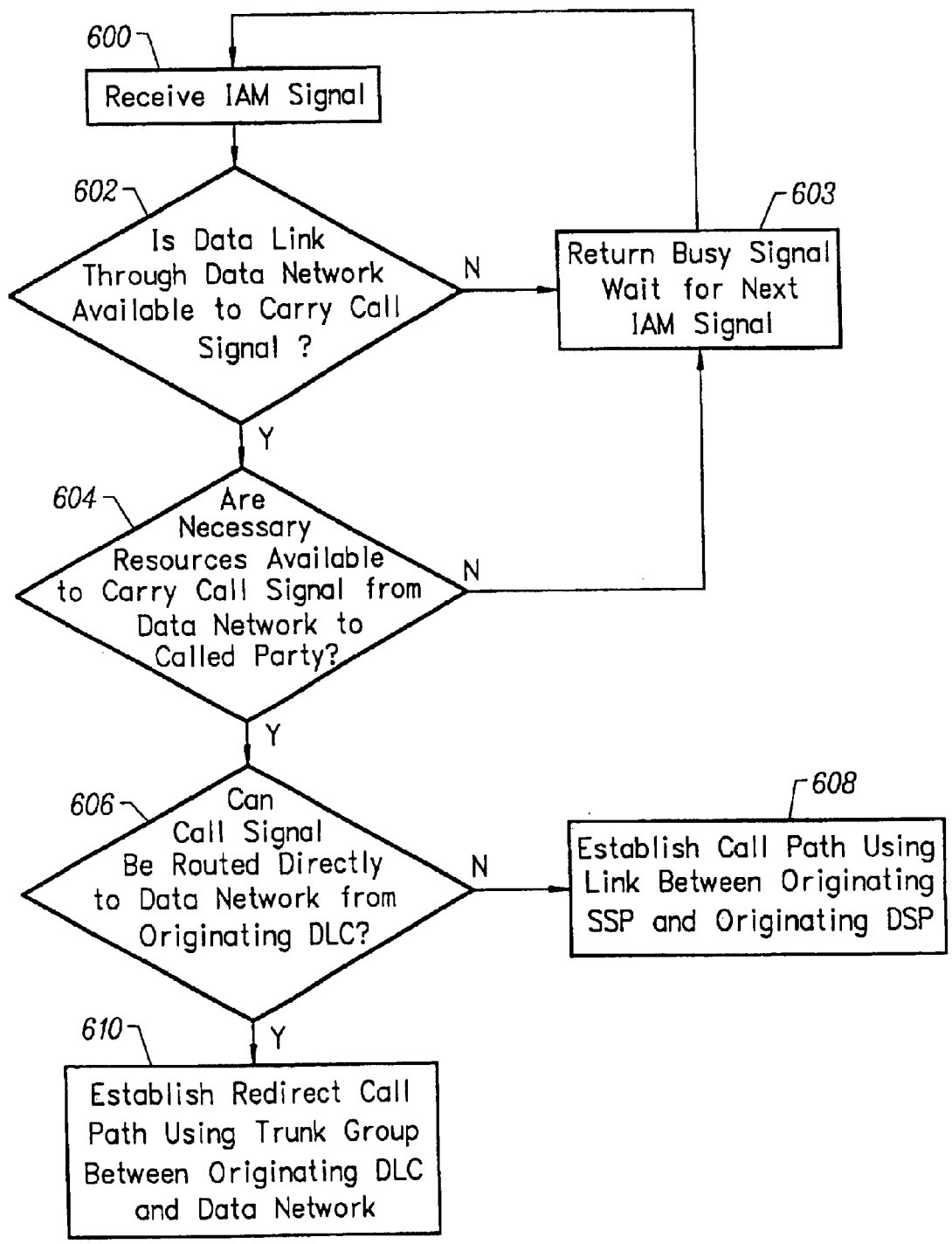
FIG. 6 is a flow diagram showing a method for establishing a direct communications path between local telecommunications networks and devices over a data network, according to an exemplary embodiment of the present invention.

In FIG. 6, after receiving the IAM signal from originating SSP 110 through originating STP 108, in step 600, originating megahub controller 128 then determines whether a data link between originating DSP 122 and terminating DSP 150 over data network 102 is available to carry the call signal, in step 602. This entails decoding the dialed digits, and conducting a table-lookup in DSP database 516 using the decoded digits as an index. In this way, originating megahub controller 128 attempts to map the called number to terminating DSP 150, to identify terminating DSP 150 as the DSP which serves terminating telephone line 148. If terminating DSP 150 is not identified, no data link is available between DSPs 128 and 150, so originating megahub controller 128 signals originating SSP 110 to relay a busy signal back through originating DLC 116 to communications device 114, in step 603, and waits for a subsequent IAM signal to return to step 600. If terminating DSP 150 is identified in the table look-up, the flow progresses to step 604.

In FIG. 6, step 604 involves originating megahub controller 128 determining whether the necessary resources are available, for example, in terminating DSP 150, terminating network 106, and terminating DLC 144, to carry the call from data network 102 to the called party. This determination is discussed in greater detail below, with reference to FIG. 7. Step 604 also involves determining whether the call can be routed from terminating DSP 150 to terminating communications device 142 directly through terminating DLC 144, thereby bypassing terminating network 106, which is discussed in greater detail below with reference to FIG. 8.

In step 604 of FIG. 6, if the needed resources are unavailable, the flow progresses to step 603, or originating megahub controller 128 may repeat step 604 one or more times at predetermined time intervals. If steps 602 and 604 are satisfied, originating megahub controller 128 lastly determines, in step 606, whether the call signal can be routed directly to originating DSP 122 from originating DLC 116 along direct trunk 124, bypassing originating network 104. This determination is made by signaling between originating megahub controller 128 and originating DLC 116 over control link 134. In particular, an SS7 bit is assigned a logical "1" in a signal passed from originating DLC 116 to originating megahub controller 128 if originating SSP 110 has any features activated on line 120 which do not support direct communication between originating DLC 116 and DSP 124, as described in greater detail below with reference FIG. 8.

If the call cannot be routed directly to originating DSP 122 from originating DLC 116, the call should be routed through originating network 104. Thus, in step 608, the call path is established between originating communications device 114 and the particular terminating communications device identified by the calling party through originating SSP 110, using trunks 120 and 126 to define a link between originating DLC 116 and originating DSP 122. If direct routing of the call from originating DLC 116 to originating DSP 122 over direct trunk 124 is possible, in step 610, the call path is established between the communications devices over the data network similar to step 608, however, the portion of the call path between originating DLC 116 and originating DSP 122 is established using direct trunk 124.

FIG. 7 is a flow diagram showing an exemplary method for determining whether resources are available in a communications system, such as system 100 of FIG. 1, to carry a call signal from a data network to a called party. The method of FIG. 7 is implemented using associated signaling, so communications between megahub controllers are relayed through DSPs over data network 102. Alternatively, non-associated signaling arrangement as shown in FIG. 3 may be used, in which communications between megahub controllers are carried via dedicated control link 302. After a data link between DSPs 122 and 150 is identified, originating megahub controller 128 then sends a call setup signal to originating DSP 122. Responsive to the call setup signal, in step 700, originating DSP 122 sends a connection request signal over data network 102 to terminating DSP 150 and terminating megahub controller 152. The connection request signal is sent by originating DSP 122 using information conveyed from originating megahub controller 128 in the call setup signal, specifically: (i) the number of the calling party, (ii) the originating point code identifying originating megahub controller 128, (iii) the destination point code identifying terminating megahub controller 152, and (iv) the number of the called party.

Upon receiving the connection request signal, in step 701, terminating megahub controller 152 indexes the trunk group database using the called party's telephone number to ensure that an SS7 trunk group exists to carry the call from terminating DSP 150 to determining SSP 138. In step 702, terminating megahub controller 152 sends SS7 messages to terminating SSP 138 through terminating DSP 150, including trunk group and member number information. Call information for the calling party number used for CLASS calls is updated into the terminating number line memory of terminating SSP 138. In step 704, terminating SSP 138 then determines whether the call signal can be relayed there through to terminating communications device 142. This includes ensuring that line 148 to terminating DLC 144 is available to deliver the call to terminating DLC 144, ensuring that terminating DLC 144 can communicate the call signal to terminating communications device 142, and ensuring that terminating line 146 is not idle or busy. If the call cannot be accepted for any of these reasons, in step 706, the terminating SSP communicates a misroute signal back to terminating DSP 150, from which the misroute signal is relayed back through data network 102 to originating DSP 122 and originating megahub controller 128.

In FIG. 7, upon receiving the misroute signal, originating megahub controller 128 can then either reattempt to establish communications with the called party, or "tear down" communications with originating DSP 122 and data network 102, in step 708. Reattempts by originating megahub controller 128 to establish communications with the called party, where the line of the called party is idle, may include selecting a different data network to carry the call. "Tearing down" communications involves sending a release complete message ("RLC") signal through originating STP 108 to originating SSP 110 to stop communications therewith. If a direct path has been established to route the call from originating communications device 114 directly to originating DSP 122 through originating DLC 116, described in greater detail below, originating megahub controller 128 signals originating DLC 116 to terminate the direct call path established between originating DLC 116 and originating DSP 122. Originating megahub controller 128 may also forward the misroute signal to a megahub controller maintenance terminal (not shown).

In FIG. 7, if a call path can be established between terminating DSP 150 and terminating communications device 142 through terminating SSP 138 or directly through terminating DLC 144, in step 710, terminating DSP 150 sends a signal to terminating SSP 138, over the SS7 trunk coupled therebetween, to determine which routing option should be used. This signal is preferably in TCAP message format. Terminating SSP 138 determines whether the call can be transmitted from terminating DSP 150 to terminating communications device 142 directly through terminating DLC 144 or, alternatively, if the call should be directed to terminating communications device 142 through terminating network 106.

FIG. 8 is a flow diagram showing an exemplary method terminating SSP 138 may use for establishing a direct communications path between a DLC and a DSP. This method is used to determine whether calls may be transmitted directly, from originating communications device 114 to originating DSP 122 over direct trunk 124, and from terminating communications device 142 to terminating DSP 150 through terminating DLC 144. The principles of this method apply to calls placed from originating communications device 114 to terminating communications devices 142 or 154, and from terminating communications devices 142 or 154 to originating communications device 114. The method of FIG. 8 is described below, however, only with respect to establishing a direct path between terminating DSP 150 and terminating DLC 144, for simplicity.

In FIG. 8, terminating megahub controller 152 sends a transactional capabilities application part ("TCAP") message signal, which includes calling and called number information, to terminating SSP 138. In this way, terminating megahub controller 152 requests whether circuitry within terminating SSP 138 which serves terminating communications device 142 through terminating DLC 144 has any calling features activated for the dialed telephone number which are generally incompatible with DLCs. These features include call forwarding in step 800, call waiting in step 802, three way calling in step 804, wire taps for eavesdropping by third parties in step 806, or other features known to those skilled in the art which would not support a direct connection between terminating DSP 150 and terminating communications device 142 through a terminating DLC 144.

In FIG. 8, if any of the features set forth above are activated for terminating telephone line 146, in step 808, terminating SSP 138 sends to terminating DSP 150, over the SS7 trunk therebetween, a response signal indicating that routing of the call through originating DLC 116 is not possible. This response signal is preferably in TCAP message format. Terminating DSP 150 receives and interprets the TCAP response signal, and establishes a portion of the call path between terminating DSP 150 and terminating DLC 144 through terminating SSP 138, the default selection for the portion of the call path between terminating DSP 150 and terminating DLC 144.

In FIG. 8, if none of the calling features described above are activated in terminating SSP 138 for terminating telephone line 146, terminating SSP 138 sends to terminating DSP 150 a response signal indicating that routing of the call through terminating DLC 144 is possible, in step 810. Thus, terminating DSP 150 establishes a portion of the call path directly between terminating DSP 150 and terminating DLC 144 to communicate the call signal to terminating communications device 142, bypassing terminating network 106. If communications device 142 and terminating DLC 144 are served by a GR-303 interface to terminating SSP 148, then DLC 144 sends an embedded operations channel ("EOC") message to terminating SSP 138 over line 148 to indicate that line 148 is call "busy." Terminating SSP 138 uses the TCAP calling number and called number information to update the line history block with called number information. In addition, terminating SSP 138 determines whether and any wire tap or call trace features are activated for line 148.

After the call path is determined between terminating DSP 150 and terminating communications device 142, terminating SSP 138 sends a "ring" signal through DLC 144 to communications device 142. Immediately after the ring signal is transmitted, terminating SSP 138 sends terminating DSP 150 an address complete message ("ACM") signal Upon receiving the ACM signal, terminating DSP 150 sends a call processing signal, as described above, back through data network 102 to originating DSP 122 and originating megahub controller 128, along with a trunk identifier and call reference, so that communications may be established.

Returning to FIG. 6, in step 606, originating megahub controller 128 determines whether the call signal can be routed directly to originating DSP 122 from originating DLC 116 along direct trunk 124, bypassing originating network 104 using the general method described above in FIG. 8. In addition, originating megahub controller 128 conducts a table lookup in DLC database 518 using the number of the calling party to determine the appropriate trunk, for instance, direct trunk group 124. Originating megahub controller 128 then signals originating DLC 116 to determine whether direct trunk group 124 is available. If direct trunk 124 is not available, then originating DLC 116 sends a "failed with cause" signal to originating megahub controller 128. Upon receipt of the "failed with cause" signal, originating megahub controller 128 may wait a predetermined amount of time and reattempt to verify availability of direct trunk group 124, before signaling originating DLC 116, in step 608, to transmit the call signal to originating SSP 110 over line 120 for transmission to originating DSP 122, using conventional telephone switching in originating network 104.

In FIG. 6, if originating SSP 110 has no features active which do not support direct routing of calls from originating DLC 116 to originating DSP 122, and if direct trunk 124 is available, originating megahub controller 128 signals originating DLC 116 over dedicated control link 134, in step 610, to use direct trunk group 124 for routing of the call from originating DLC 116 to originating DSP 122. This information may be in the form, for example, of a telephone number identifying direct trunk group 124, possibly retrieved from trunk group database 520, in FIG. 5. Originally megahub controller 128 also sends specific trunk group and line identification and circuit number information to originating DLC 122, over dedicated control link 134, to establish the connection between originating DLC 116 and originating DSP 122. The call path is then complete, at which time originating DLC 116 sends a signal over line 120 to originating SSP 110 to indicate that line 120 is busy.

A ring signal is applied to communications device 142, as explained above. Once the called party answers the call, e.g., lifts the telephone receiver off of the hook, an off-hook condition is recognized by terminating DLC 144 and terminating SSP 138. Terminating SSP 138 then sends an answer message ("ANM") signal to terminating DSP 150, which may be relayed to terminating megahub controller 152. Terminating megahub controller 152 or terminating DSP 150 may then send a connect signal, as described above, over data network 102 to originating DSP 122. Thereafter, data may be transferred between the calling party and the called party over the established call path.

The actual amount and length of data transfer varies, depending on the format of the call signal. With particular regard to FAX signals, originating DSP 122 receives a FAX transmission from either originating SSP 110 or originating DLC 116, and typically stores the transmitted FAX data onto a local disk. Originating DSP 122 then sends the FAX signal to terminating DSP 150, generally using either secure e-mail or FTP. Upon receiving the FAX signal, terminating DSP 150 then schedules delivery of the FAX signal to the called party via terminating DLC 144 and terminating telephone line 146, assuming terminating DSP 150 and terminating DLC 144 support the FAX format of the signal.

During data transfer, either party may terminate the call by opening the connection between the communications device used by that party and the DLC to which the communications device is coupled. For example, in FIG. 1, if communications device 142 is a conventional telephone, the called party terminates the call by placing the receiver on the hook of the telephone. The terminating DLC 144 recognizes this as an "on-hook" condition, and communicates this condition as a signal to terminating SSP 138. Responsive thereto, terminating SSP 138 sends a release message ("REL") signal to terminating DSP 150, from which the REL signal is relayed to terminating megahub controller 152. Upon receiving the REL signal, terminating megahub controller 152 sends a release signal (described in greater detail above) over data network 102 to originating DSP 122, which forwards the signal to originating megahub controller 128. Originating megahub controller 128 may then terminate communications with terminating megahub controller 152.

Access by Users

A user of any of the communications systems described above may act as the calling party or called party. If acting as the calling party, the user desirably is provided with the ability to select a communications path for the call signal he intends to send over the data network. Various systems and methods enable the user to make this selection, in accordance with exemplary embodiments of the present invention. For example, if DSPs in the communications system are programmed with carrier codes (e.g., 5 digit codes such as '10322'), a user may select a particular DSP for sending the call over the data network by dialing the carrier code of that DSP before the dialing the called number. This type of selection would override the default call routing through and between local telecommunications networks only such as PSTNs (without using data networks such as the Internet).

According to other exemplary embodiments, the user may select a particular DSP as a carrier by dialing 800 or 900 numbers (e.g., dialing 1-800-xxx-xxxx, or 1-900-xxx-xxxx, where "xxx-xxxx" represents the number of the called party). Alternatively, the carrier selection may be programmed into a local SSP when the user orders telephone service from a corresponding local telecommunications networks, such that all calls would be routed through the data network by the particular DSP identified in the SSP programming. Other carrier selection systems and methods contemplated in accordance with the present invention include dedicated NXX number routing (e.g., dialing xxx-xxxx or NPA-xxx-xxxx), local 7 digit calls with conventional 6/10 digit routing (e.g., dialing nxx-xxxx), and local toll or long distance calls with standard 6/10 digit routing (e.g., dialing NPA-Nxx-xxxx).

It should be understood that the particular embodiments described above are only illustrative of the principles of the present invention, and various modifications could be made by those skilled in the art without departing from the scope and spirit of the invention. Thus, the scope of the present invention is limited only to the extent of the claims that follow.

What is claimed is:

1. A method of establishing a communications path between a digital loop carrier and a data network service provider in communication with a data network for carrying a call signal between a communications device and a data network, the digital loop carrier: (I) coupled to the communications device, (ii) coupled directly to the data network service provider by a direct trunk group, and (iii) coupled to a service switching port of a telecommunications network by a communications line, the service switching port coupled to the data network service provider, the service switching port having a call processing feature which, when activated by the service switching port, processes calls transmitted over the communications line, the method comprising:

determining whether the service switching port has activated the call processing feature for the communications line;

establishing, when the call processing feature is active, the communications path through the service switching port over the communications line; and establishing, when the call processing feature is inactive, the communications path using the direct trunk group.

2. The method of claim 1 wherein the call processing feature is call forwarding.

3. The method of claim 1 wherein the call processing feature is call waiting.

4. The method of claim 1 wherein the call processing feature is three-way calling.

5. The method of claim 1 wherein the call processing feature is wire-tapping.

6. The method of claim 1 wherein determining whether the service switching port has activated the call processing feature includes sending a TCAP query to the service switching port.

7. The method of claim 6 wherein the TCAP query is sent to the service switching port over an SS7 'A' link.

8. The method of claim 6 further comprising updating a line history block with, in the TCAP query, called number and calling number Information, when the call processing feature is inactive.

9. A system for establishing a communications path between a communications device and a data network, the system comprising:
  a data network service provider in communication with the data network;
  a digital loop carrier coupled to the communications device, and coupled directly to the data network service provider to provide a direct call path between the digital loop carrier and the data network service provider for routing call signals between the communications device and the data network; and
  a megahub controller coupled to the digital loop carrier to control the routing of the call signals over the direct call path.

10. The system of claim 9 further comprising a telecommunications network having a service switching port coupled between the data network service provider and the digital loop carrier, the megahub controller coupled to route the call signals from the digital loop carrier to the data network service provider over the direct call path or through the service switching port of the telecommunications network.

11. A system for establishing a communications path between an originating communications device and a terminating communications device over a data network, the system comprising:
  an originating data network service provider in communication with the data network;
  a terminating data network service provider in communication with the data network;
  an originating digital loop carrier coupled to the originating communications device, and coupled directly to the originating data network service provider to provide an originating direct call path between the originating digital loop carrier and the originating data network service provider for routing call signals from the originating communications device to the data network;
  a terminating digital loop carrier coupled to the terminating communications device, and coupled directly to the terminating data network service provider to provide a terminating direct call path between the terminating digital loop carrier and the terminating data network service provider for routing the call signals from the data network to the terminating communications device; and
  an originating megahub controller coupled to the originating digital loop carrier to control the routing of the call signals over the originating direct call path.

12. The system of claim 11 further comprising a terminating megahub controller coupled to the terminating digital loop carrier to control the routing of the call signals over the terminating direct call path.

13. A data network service provider comprising:
  a communication link with a data network and coupled directly to a digital loop carrier and having a plurality of paths for routing a call signal having one of a plurality of formats between the digital loop carrier and the data network, the data network service provider having circuitry configured to identify the format of the call signal and select one of the paths to carry the call signal based on the identified format; and
  a coupling to a service switching port of a telecommunications network for routing the call signal between the digital loop carrier and the data network through the service switching port.

14. A data network service provider in communication with a data network through a network I/O interface and coupled directly to a digital loop carrier for routing a call signal having a predetermined format between the digital loop carrier and the data network, the data network service provider having a voice path, a facsimile path, and a modem path each coupled between the digital loop carrier and the network I/O interface, the data network service provider comprising;
  a voice line unit coupled to identify the format of the call signal as voice-coding and route the voice-coded call signal through the voice path;
  a facsimile line unit coupled to identify the format of the call signal as facsimile-coding and route the facsimile-coded call signal through the facsimile path; and
  a modem line unit coupled to identify the format of the call signal as modem-coding and route the modem-coded signal through the modem path.

15. The data network service provider of claim 14 further comprising:
  voice processing circuitry coupled between the voice line unit and the network I/O interface and configured to process the voice-coded call signal routed along the voice path;
  a facsimile modem coupled between the facsimile line unit and the network I/O interface and configured to process the facsimile-coded call signal routed along the facsimile path; and
  a V.56 modem coupled between the modem line unit and the network I/O interface and configured to process the modem-coded call signal routed along the modem path.

16. The data network service provider of claim 15 wherein the voice processing circuitry includes a silence suppression unit, a voice compression unit, and a white noise generator.

* * * * *